E. E. DILLEHAY.
AUTOMATIC DUMPING CAR.
APPLICATION FILED JULY 31, 1914.

1,119,688.

Patented Dec. 1, 1914.

3 SHEETS—SHEET 1.

Witnesses

Inventor
E. E. Dillehay
By Victor J. Evans
Attorney

E. E. DILLEHAY.
AUTOMATIC DUMPING CAR.
APPLICATION FILED JULY 31, 1914.
1,119,688.
Patented Dec. 1, 1914.
3 SHEETS—SHEET 2.
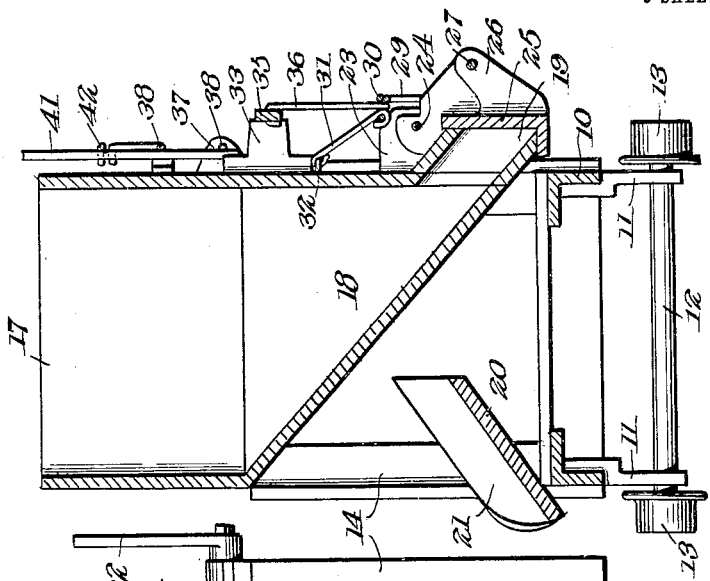
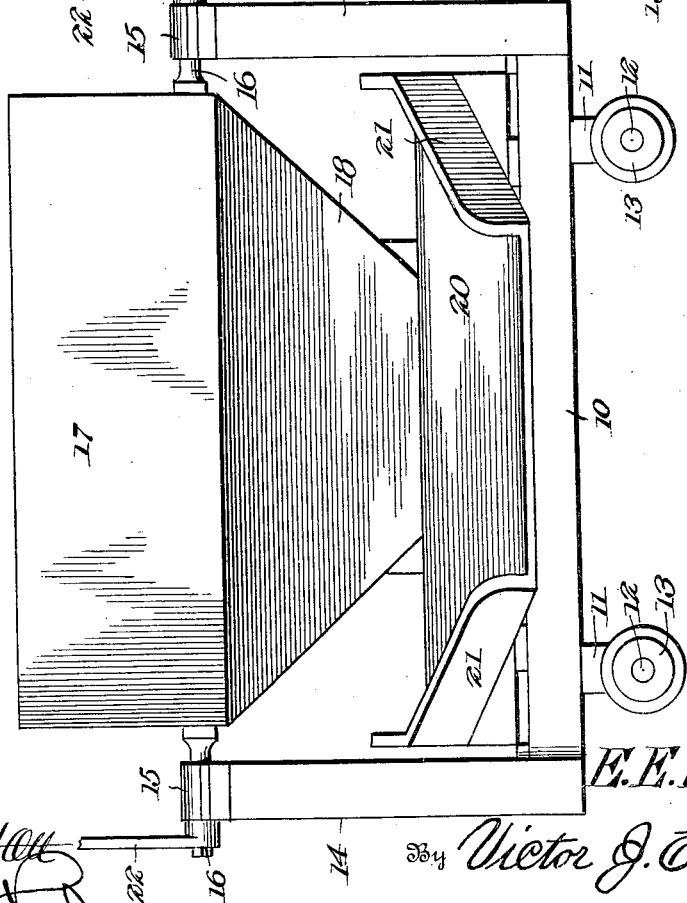
Witnesses
Hugh H. Ott
F. O. Parker
Inventor
E. E. Dillehay
By Victor J. Evans
Attorney E. E. DILLEHAY.
AUTOMATIC DUMPING CAR.
APPLICATION FILED JULY 31, 1914.
1,119,688.
Patented Dec. 1, 1914.
3 SHEETS—SHEET 3.
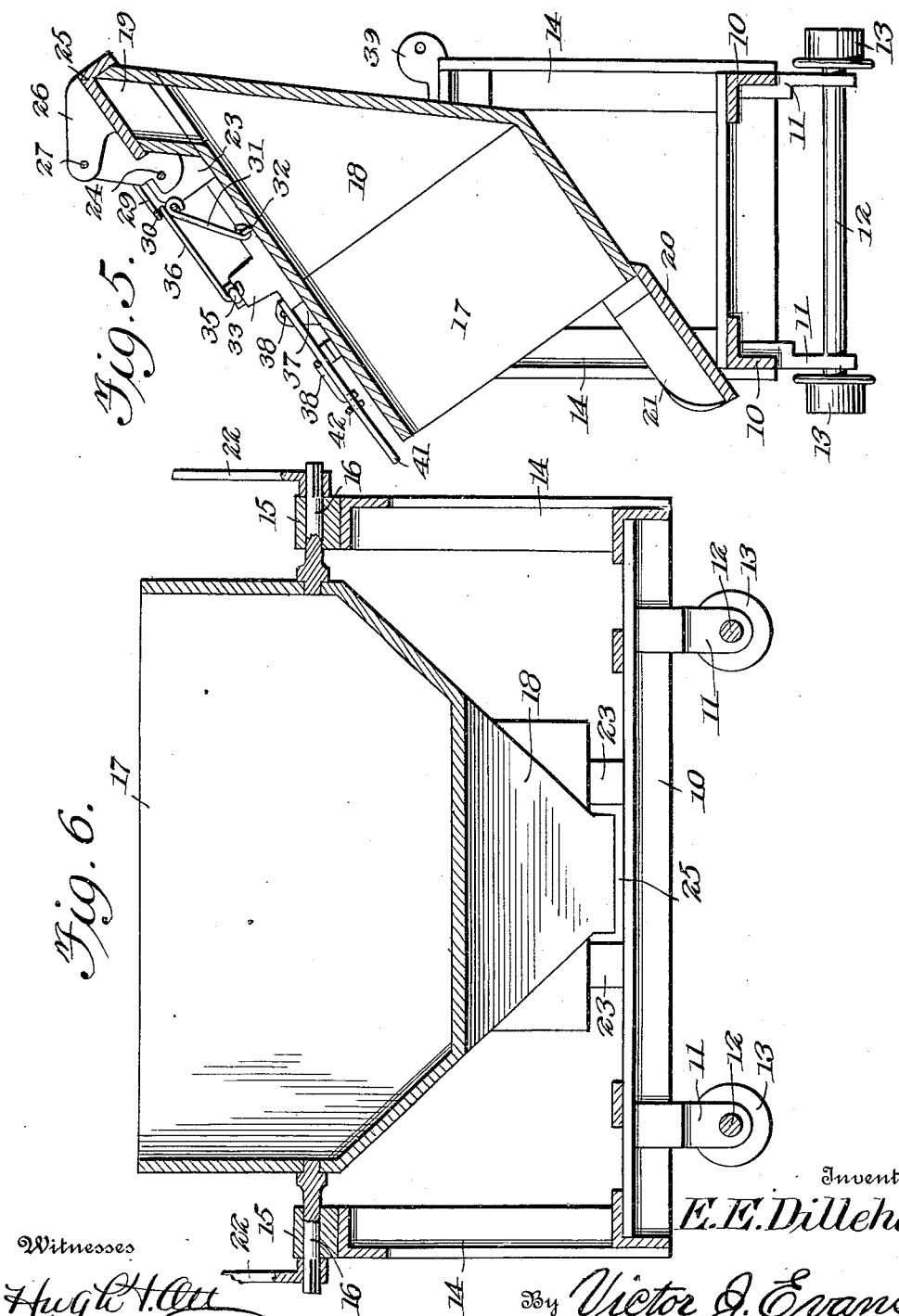

UNITED STATES PATENT OFFICE.

EARNEST E. DILLEHAY, OF LIMA, OHIO.

AUTOMATIC DUMPING-CAR.

1,119,688.  Specification of Letters Patent.  Patented Dec. 1, 1914.

Application filed July 31, 1914. Serial No. 854,426.

*To all whom it may concern:*

Be it known that I, EARNEST E. DILLEHAY, a citizen of the United States, residing at Lima, in the county of Allen and State of Ohio, have invented new and useful Improvements in Automatic Dumping-Cars, of which the following is a specification.

The invention relates to cars and more particularly to the class of automatic dumping cars.

The primary object of the invention is the provision of a dumping car wherein the load or its contents can be dumped in bulk or gradually delivered therefrom, the body of the car being of novel form to insure the quick and easy dumping thereof.

Another object of the invention is the provision of a car of this character wherein the contents thereof can be dumped to either side of the track so as not to interfere with the travel of the car, the body of the latter being readily locked against dumping action to insure the safe transportation of its load from one point to another.

A further object of the invention is the provision of a dump car which is simple in construction, strong and durable yet possessing minimum weight, thoroughly reliable and efficient in operation and inexpensive in manufacture.

With these and other objects in view the invention consists in the construction, combination and arrangement of parts as will be hereinafter fully described, illustrated in the accompanying drawing and pointed out in the claims hereunto appended.

Figure 1:
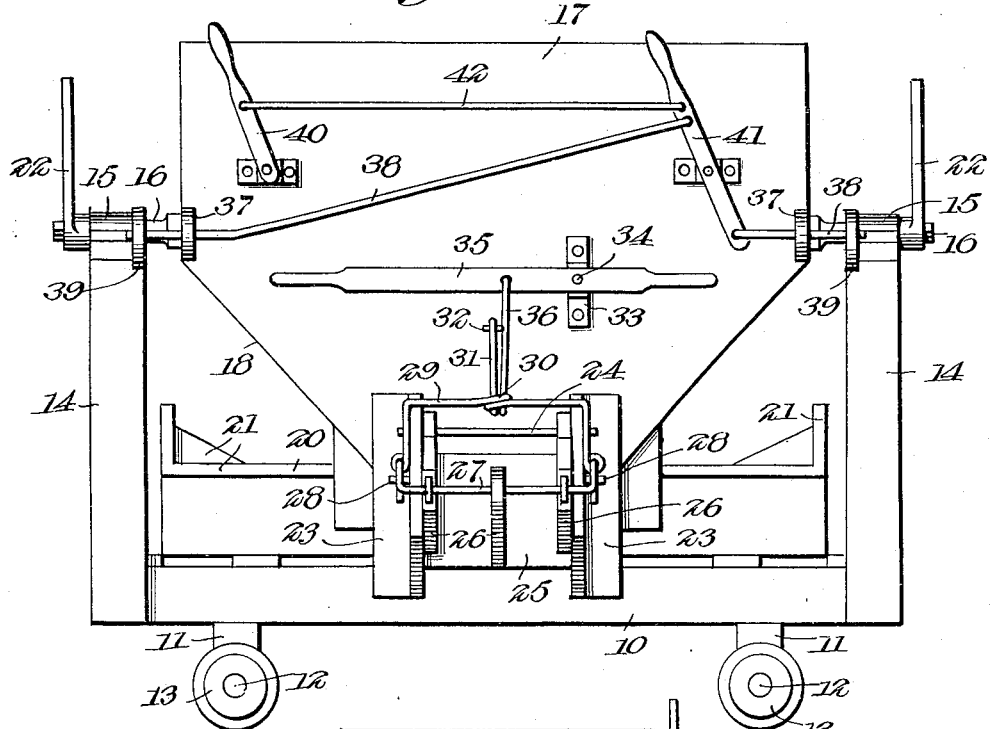
Figure 3:
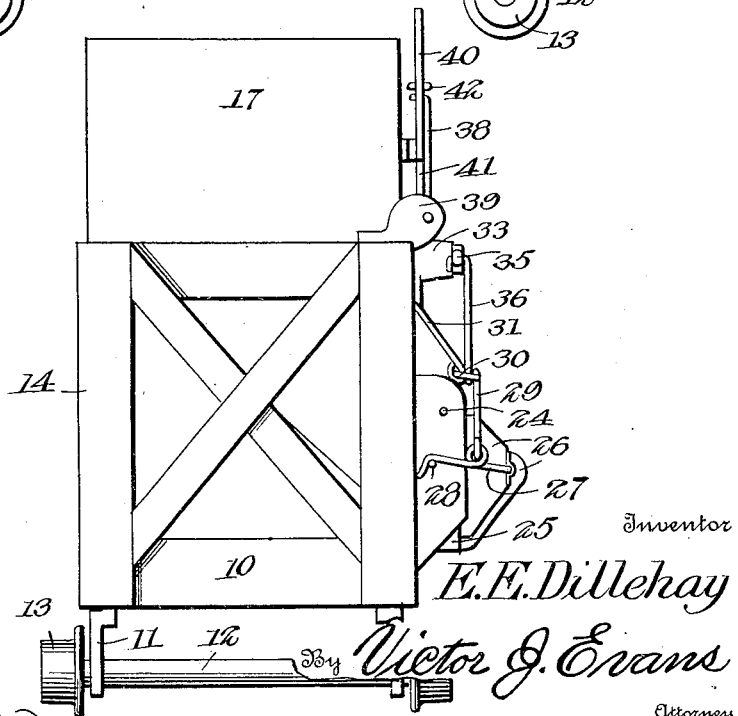

In the drawings: Figure 1 is a side elevation of a dump car constructed in accordance with the invention, Fig. 2 is a similar view looking toward the opposite side of the car, Fig. 3 is an end elevation, Fig. 4 is a vertical transverse sectional view through the car. Fig. 5 is a similar view showing the body tilted. Fig. 6 is a vertical longitudinal sectional view.

Similar characters of reference designate corresponding parts throughout the several views.

Referring to the drawings in detail, the car comprises a truck frame 10 to which is fixed the axle bearings 11 having journaled therein axles 12 carrying car wheels 13 which are of the ordinary construction. Fixed to and rising from opposite ends of the truck frame 11 are vertical frames or uprights 14 supporting bearings 15 which are in alinement with each other and arranged at one side of the longitudinal center line of the truck frame and in which are journaled the trunnions or stub axles 16 of a hopper swinging dump body 17 which is formed with a laterally inclined downwardly tapered discharge bottom 18 formed with a discharge mouth 19 at one side of the said body.

Fixed to the truck frame on the side thereof opposite the mouth 19 of the body 17 is an inclined dump chute 20 so that on the swinging of the body the contents thereof can be delivered to the chute which discharges the said contents in bulk to one side of the truck frame. The chute 20 has mounted thereon the downwardly converging flanges 21 which directs the contents delivered onto the chute to a common discharge point thereof, the contents from the body 17 when tilted or inverted being delivered to the chute through the open top of said body, as will be apparent. Fixed to the trunnions or stub axles 16 at the ends are hand cranks 22 which permit the turning of the body for the dumping of the contents thereof in bulk.

Fixed to the side wall of the body 17 at opposite sides of the mouth 19 are parallel angle pieces 23 supporting a pivot 24 carrying a swinging door or gate 25 which is adapted to close the mouth 19, the said door or gate being formed at its outer side with intermediate and outer bearings 26 in which is arranged a catch bail or latch 27, the same being adapted for engagement with keeper lugs 28 formed on and projecting from the outer flanges of the angle pieces 23 so as to fasten the door or gate closed. Swingingly connected to the bail or latch 27 is an inverted substantially U-shaped yoke 29 formed with a central eye 30 to which is loosely connected a fulcrum link 31 swingingly attached to the side of the body 17 while above the mouth 19 and fixed to the side of the body 17 is a bracket 33 to which is pivoted, at 34, a hand lever 35 having loosely connected thereto a lift rod 36, the same being loosely connected to the eye 30 on the yoke 29 and this lever 35 is designed for opening and closing the gate or door 25 so that all of the contents of the body or a portion thereof can be gradually discharged therefrom at the side of the truck frame 10 opposite the chute 20 thereon.

Formed on the side of the body 17 provided with the mouth 19 are guide ears 37 in which work locking rods 38, the same being adapted to engage in keeper ears 39 fixed to or formed on the uprights 14 for locking the body 17 against swinging or tilting movement, while pivotally supported on the side of the body carrying the ears 37 are spaced operating levers 40 and 41, the latter having loosely connected thereto at opposite sides of its pivot the locking rods 38 so that on the swinging of the said lever 41, the rods can be moved for locking or unlocking the body. These levers 40 and 41 are arranged near opposite ends of the body and are connected together through the medium of a rod 42 so that on operating either of the levers, the locking bars 38 can be shifted, thus enabling the locking or unlocking of the body at either end of the truck frame.

The angle pieces 23 extend below the lowermost point of the body 17 to engage one side of the truck frame 10 so that the body 17 can be tilted or turned to one side only of the truck frame for the dumping of the contents of the body in bulk.

From the above description, taken in connection with the accompanying drawings, the simplicity of the device as well as the advantages thereof will, it is thought, be perfectly apparent to those skilled in the art to which such invention appertains without further detailed description.

Having thus described the invention, what I claim is:

1. A dump car comprising a wheeled truck frame, uprights rising from opposite ends of the frame, a swinging body journaled on said uprights and having a laterally inclined and downwardly tapered bottom formed with a mouth at one side of the bottom, keeper ears formed on the uprights, locking means carried by the body for engagement with the keeper ears to lock the body against dumping movement, a chute arranged on the frame beneath the inclined bottom of the body, and means for closing the mouth of the body.

2. A dump car comprising a wheeled truck frame, uprights rising from opposite ends of the frame, a swinging body journaled on said uprights and having a laterally inclined and downwardly tapered bottom formed with a mouth at one side of the bottom, keeper ears formed on the uprights, locking means carried by the body for engagement with the keeper ears to lock the body against dumping movement, a chute arranged on the frame beneath the inclined bottom of the body, means for closing the mouth of the body, and means for manually turning the body.

3. A dump car comprising a wheeled truck frame, uprights rising from opposite ends of the frame, a swinging body journaled on said uprights and having a laterally inclined and downwardly tapered bottom formed with a mouth at one side of the bottom, keeper ears formed on the uprights, locking means carried by the body for engagement with the keeper ears to lock the body against dumping movement, a chute arranged on the frame beneath the inclined bottom of the body, means for closing the mouth of the body, means for manually turning the body, and means for operating the means for closing the mouth and also for locking it when in closing position.

4. A dump car comprising a wheeled truck frame, uprights rising from opposite ends of the frame, a swinging body journaled on said uprights and having a laterally inclined and downwardly tapered bottom formed with a mouth at one side of the bottom, keeper ears formed on the uprights, locking means carried by the body for engagement with the keeper ears to lock the body against dumping movement, a chute arranged on the frame beneath the inclined bottom of the body, means for closing the mouth of the body, means for manually turning the body, means for operating the means for closing the mouth and also for locking it when in closing position, and hand operable levers pivoted to the body for operating the first mentioned locking means.

In testimony whereof I affix my signature in presence of two witnesses.

EARNEST E. DILLEHAY.

Witnesses:
 B. H. HOLMES,
 JAMES J. MADOCK.